Feb. 20, 1951     H. L. MORMANN     2,542,346
ADJUSTABLE FEEDER FOR GRAIN PANS FOR GRAIN COMBINES
Filed March 19, 1947     3 Sheets-Sheet 1

Inventor
Henry L. Mormann

Feb. 20, 1951        H. L. MORMANN        2,542,346
ADJUSTABLE FEEDER FOR GRAIN PANS FOR GRAIN COMBINES
Filed March 19, 1947        3 Sheets-Sheet 2
*Fig. 2.*
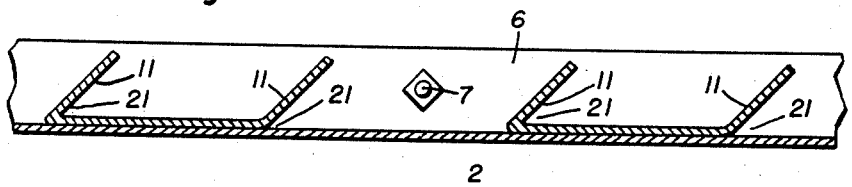
*Fig. 3.*
*Fig. 4*
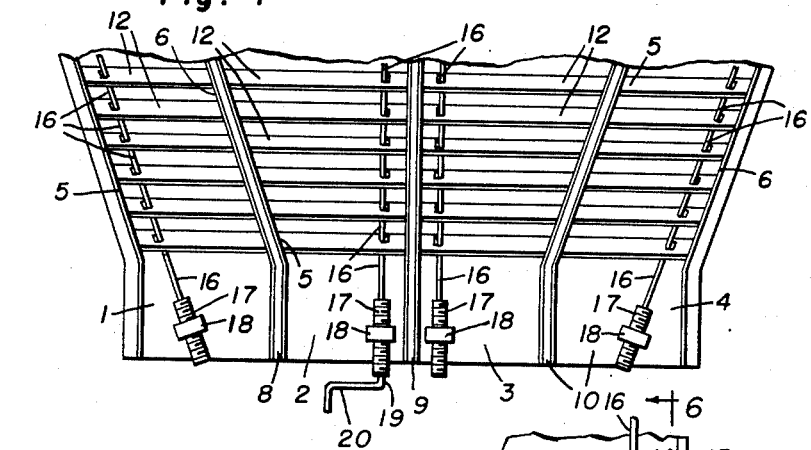
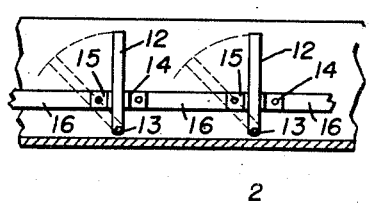
*Fig. 6.*
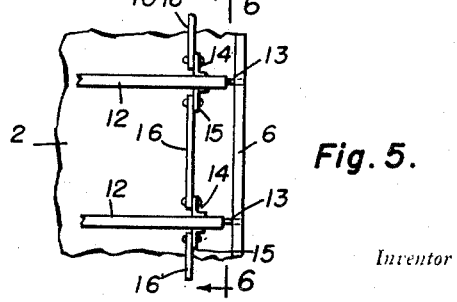
*Fig. 5.*
Inventor
Henry L. Mormann
By *Clarence A. O'Brien and Harvey B. Jacobson*
Attorneys Feb. 20, 1951     H. L. MORMANN     2,542,346
ADJUSTABLE FEEDER FOR GRAIN PANS FOR GRAIN COMBINES
Filed March 19, 1947     3 Sheets-Sheet 3
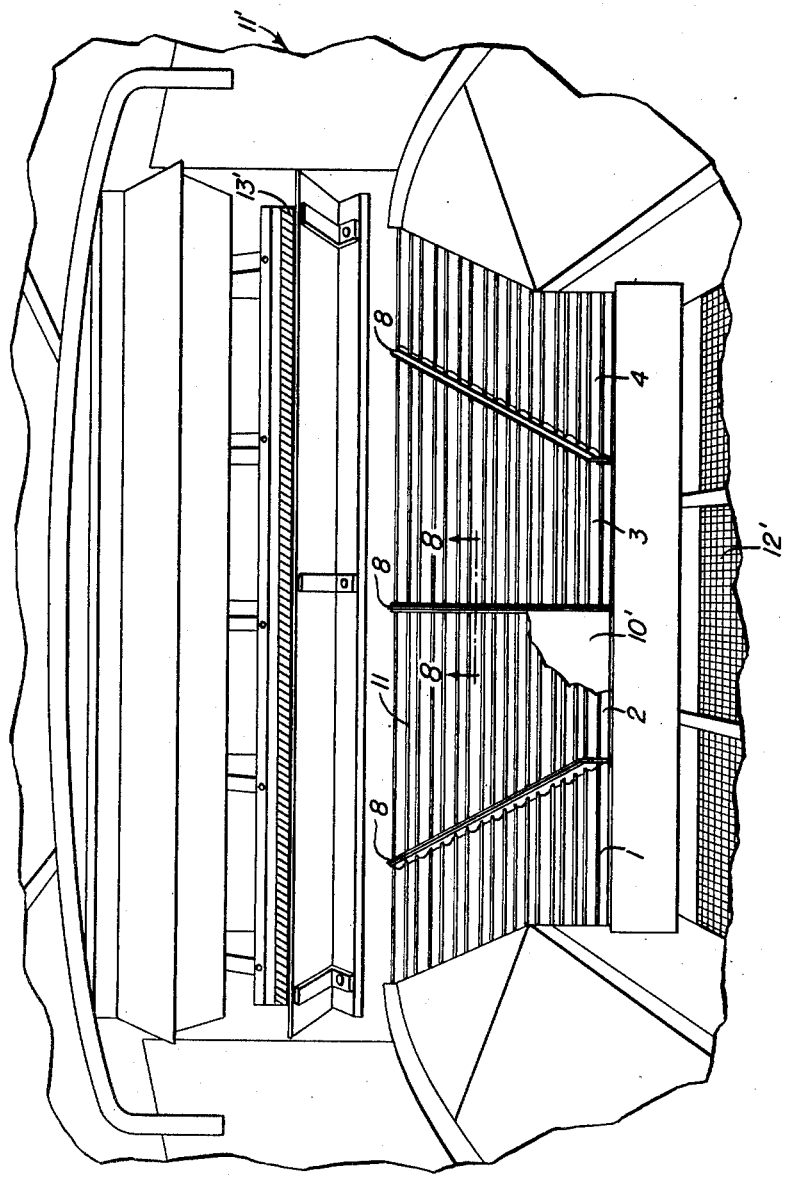
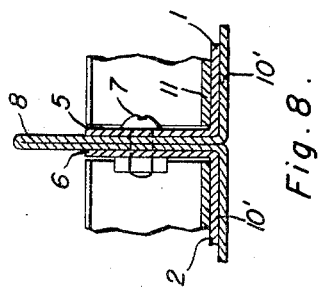
Henry L. Mormann
INVENTOR.

Patented Feb. 20, 1951

2,542,346

UNITED STATES PATENT OFFICE 2,542,346

ADJUSTABLE FEEDER FOR GRAIN PANS FOR GRAIN COMBINES

Henry L. Mormann, Dyersville, Iowa, assignor of one-half to Leo J. Zimmer, Dyersville, Iowa Application March 19, 1947, Serial No. 735,670

1 Claim. (Cl. 130—24)

This invention relates to improvements in removable steps for grain pans for grain combines.

An object of the invention is to provide an improved form of removable step for grain combines which will be especially useful in hilly land for preventing overloading on the screen and the spilling of the grain over the edges thereof onto the ground resulting in a total loss of the grain thus spilled.

Another object of the invention is to provide an improved removable step for grain combines which may be quickly attached in position to the three iron ribs which are customarily provided and extend longitudinally of the grain pan of a combine.

A further object of the invention is to provide an improved adjustable step for positioning in the grain pan of a grain combine, and means for simultaneously adjusting the louvers or plates in the step depending upon the nature of the terrain over which the combine is being operated.

Another object of the invention is to provide an improved removable and adjustable step for the pans of grain combines which will be highly efficient in operation, and relatively inexpensive to manufacture and produce.

Other objects will appear as the description proceeds.

In the accompanying drawings which form a part of this application,

Figure 2 is a sectional view taken on the line 2—2 of Figure 1;

Figure 3 is a front elevation of the step construction illustrated in Figures 1 and 2;

Figure 4 is a plan view of a modification of the step being partly broken away and showing the adjusting means for variably adjusting the angular inclination of the pivoted louvers or baffles;

Figure 5 is an enlarged detail plan view of the ends of two adjacent pivoted louvers or baffle plates showing the link connections between the same, and Figure 6 is a view taken on the line 6—6 of Figure 5.

Figure 7 is a perspective view of a portion of a grain combine with the attached step; and Figure 8 is a sectional view taken substantially on the plane of section line 8—8 of Figure 7.

Like characters of reference are used throughout the following specification and the accompanying drawings to designate corresponding parts.

Figure 1:
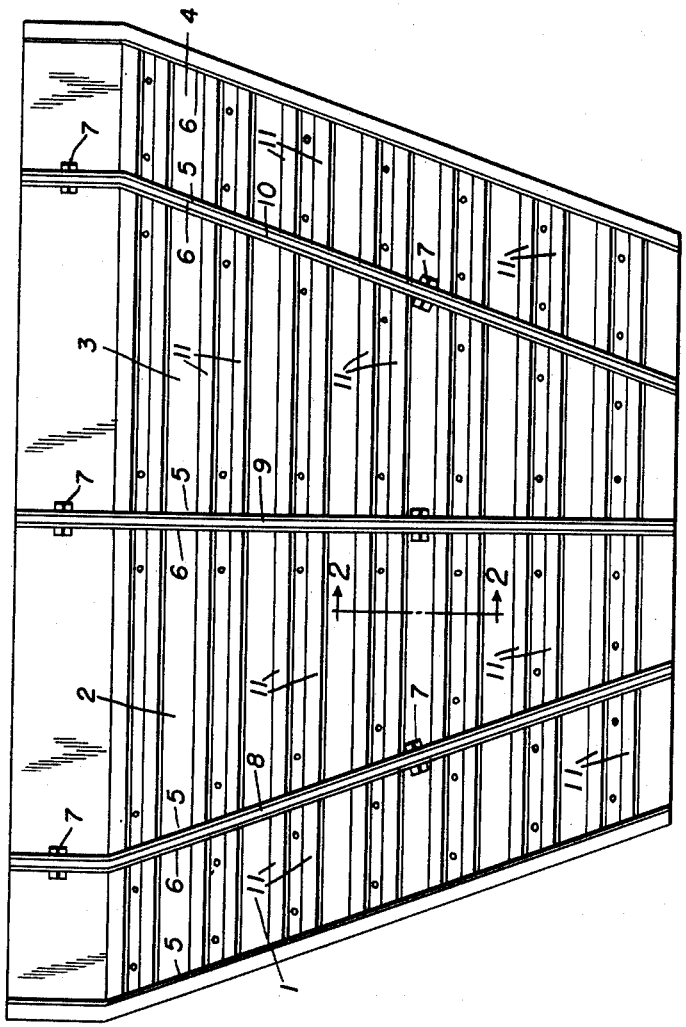
Figure 1 is a perspective view of the improved removable and adjustable step for the pan of a grain combine.

In carrying out the invention, there is provided and illustrated in Figures 1 to 3 and 7 and 8 inclusive, the most simple form of adjustable step for the pan of a grain combine comprising a series of longitudinally extending pans 1, 2, 3 and 4 having upstanding supporting flanges or sides 5 and 6, which are suitably apertured to receive the positioning bolts 7 which extend through the three iron ribs 8, 9 and 10 customarily provided, and which extend longitudinally of the usual grain pan 10' on a grain combine 11'.

A plurality of transversely extending spaced U-shaped louvers or baffle ribs 11 are secured in any desired manner to the pans 1, 2, 3 and 4, the ribs 11 being slanted toward the forward end of the combine. It is found that in combines having a flat grain pan 10' with an end shake, when operated on hilly land, the grain piles up on the forward end of the screen 12' when the machine is operating down hill. When the return trip up the hill is made and the machine is combining, this accumulated grain plus the grain that is being threshed on the uphill pull, all moves over the screen 12' at the same time, resulting in an overloading on the chaffer 13' which cannot accommodate all of the grain without a consequent loss of grain by spilling.

To adjust the angular inclination of the louvers or ribs 11, it is only necessary to take a bar and knock the same down to the desired angle, and when it is desired to raise the angle of the louvers or ribs 11, a pair of pliers may engage their upper ends to pull up on them the desired amount.

In Figures 4, 5 and 6, there is illustrated a modification of the step mechanism, and includes a series of transversely extending plates 12 being provided with pivot bearing arms 13 at their lower and opposite ends, the same being supported between the side flanges 5 and 6.

The plates 12 support the opposite ears 14 and 15, which are connected together with adjacent ears on adjacent plates by means of the connecting links 16. The end links 16 are swivelly connected to the screws 17, which are threadably and adjustably supported in the fixed nuts 18, and are provided with sockets (not shown) in their outer ends for receiving the end 19 of the crank operator 20, whereby the rotation of said crank operator 20 will vary the angular inclination of said plates 12 as desired.

In practical operation, it is to be understood that when the combine is moving up hill the screen 12' is elevated with relationship to the chaffer 13'. That is, the screen approaches the hill first and moves up the hill ahead of the chaffer, and similarly when the combine is moving down hill, the screen 12' descends the hill first and the chaffer 13' follow. Therefore, in the down hill movement of the combine the screen will always be at a lower elevation than the chaffer.

When the combine is moving up hill, the grain will pass over the screen 12' and move toward the pan 10' and the chaffer 13'. The step of the instant invention being positioned on the pan 10', by virtue of the forwardly inclined louvers 11, will retain most of the grain in the pockets 21, thus preventing an overloading of grain on the chaffer with the result that virtually no grain will spill over onto the ground. When the combine is moving down hill, the grain accumulated in the pockets 21 slide out and is deposited on the screen 12' along with any other grain that slides over the outer surfaces of the louvers 11. In other words, the device of the instant invention is in effect a plurality of obstacles in the path of the grain moving over the screen toward the pan and the chaffer. Without the forwardly inclined louvers acting as obstacles to the path of the grain, when the combine is moving up hill, the grain would move over the screen and over a relatively smooth flat pan before entering the chaffer. When a large volume of grain moves over the smooth pan and into the chaffer, obviously, the chaffer becomes overloaded. The device of the instant invention is primarily employed to prevent the overloading of the chaffer especially when the combine is operating on an up hill motion.

From the foregoing description it will be apparent that there has been devised and provided a highly efficient and relatively inexpensive removable and adjustable step for grain combines. While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

In a grain combine having a grain pan, longitudinally extending spaced supporting ribs on said pan, of a sectional step removably attached to said ribs formed with vertically upwardly extending side flanges, a plurality of transverse forwardly extending baffle plates pivotally supported between said side flanges for variable angular adjustment, ears on the opposite sides of said plates, links connecting the ears on adjacent plates, fixed nuts on said step sections, screws operable in said nuts, means for swivelly connecting the screws to adjacent links, and a crank connected to said screws for selectively varying the angular inclination of said baffle plates.

HENRY L. MORMANN.

REFERENCES CITED

The following references are of record in the file of this patent:

UNITED STATES PATENTS

| Number | Name | Date |
| --- | --- | --- |
| 509,082 | Heald | Nov. 21, 1893 |
| 645,228 | Lasswell | Mar. 13, 1900 |
| 673,210 | Lippy | Apr. 30, 1901 |
| 923,498 | Dill | June 1, 1909 |
| 1,235,899 | Jones | Aug. 7, 1917 |
| 1,565,078 | Fitzgerald | Dec. 8, 1925 |
| 1,781,857 | Pape | Nov. 18, 1930 |